INVENTOR.
ROBERT DJORUP

BY Joseph Weingarten
ATTORNEY

INVENTOR.
ROBERT DJORUP
BY Joseph Weingarten
ATTORNEY

United States Patent Office 3,089,963

Patented May 14, 1963

3,089,963
CONVERGING CHANNEL GATING SYSTEM COMPRISING DOUBLE TRANSISTOR SERIES AND SHUNT SWITCHES

Robert S. Djorup, Winchester, Mass., assignor to Epsco, Incorporated, Boston, Mass., a corporation of Massachusetts Filed Oct. 6, 1958, Ser. No. 765,660
3 Claims. (Cl. 307—88.5)

The present invention relates in general to semiconductor switches and more particularly concerns a novel analog multiplexor capable of high speed, highly accurate, arbitrary sequence commutations among a large number of input channels while providing a high degree of isolation between unselected input channels and the output terminal.

The conventional low level transistor switching device makes use of a complementary pair of NPN and/or PNP transistors, connected one to the other by their collectors, and enabling passage of an analog input signal from one emitter to the other by application of equal On currents to the two bases. If this equality is maintained despite signal perturbations in transistor element potentials, then the switch current entering one base is at all times removed at the other and does not appear as a part of the signal output current. This may be accomplished by a variety of methods, typically by floating the command source at the common collector potential.

It is well known in the art that a transistor short circuit characteristic may be predicted with much greater accuracy than its open circuit characteristic. Stated in other words, the impedance measured between forward biased elements of a transistor is generally a known constant value while the impedance measured between back-biased elements thereof is likely to vary over relatively wide limits as a function of the magnitude of the back bias, temperature and other parameters. Since this back-biased impedance is not infinite, an elementary two-transistor switching device does not satisfactorily isolate its output and input. As a result, for most low level applications, this device may not be connected to more than a very few others to produce a multiple pole switching system.

Accordingly, the present invention contemplates and has a primary object the provision of a multiple pole switching system utilizing semi-conductor devices and providing a high degree of isolation between unselected input channels and the output to permit multiplexing among a large number of channels.

According to the invention, each channel connecting an input terminal to the output is formed by cascading two semi-conductor switching devices in series and shorting their common junction to ground with a third semi-conductor switching device when the channel is unselected.

Other features, objects and advantages of the invention will become apparent from the following specification when read in connection with the accompanying drawing in which.

Figure 1:
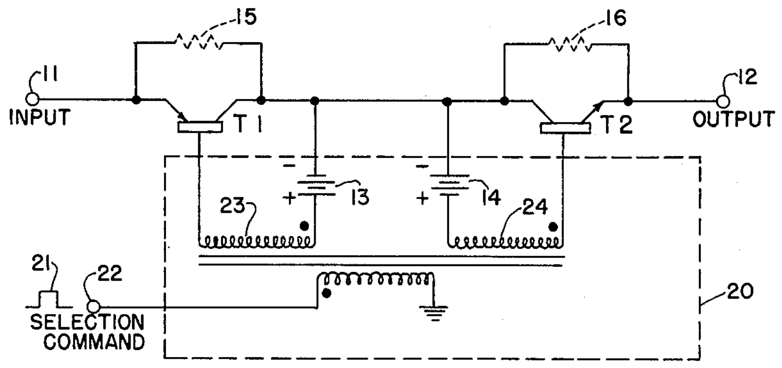
FIG. 1 is a schematic circuit diagram of a typical two-transistor switching circuit.

With reference now to the drawing and more particularly FIG. 1 thereof, there is illustrated a typical two-transistor switching circuit suitable for use in a multiplexing system according to the invention. PNP transistor T1 is cascaded with complementary NPN transistor T2 between input terminal 11 and output terminal 12 with batteries 13 and 14 supplying a biasing potential for reverse-biasing the base-collector diode portion of the respective transistors, which are normally non-conductive, and in this condition isolate terminal 11 from terminal 12 by the serial combination of leakage or reverse-biased resistances 15 and 16.

A selection command pulse 21 applied to terminal 22 generates oppositely-phased pulses across secondary windings 23 and 24, respectively, effective in rendering transistors T1 and T2 conductive, thereby connecting input terminal 11 to output terminal 12 by the very low forward impedance of the two transistors. Since the transistors exhibit complementary characteristics, the current pulses developed in response to the pulses derived across the respective secondary windings are of substantially equal magnitude and opposite sense and their effects cancel. Thus, for a single channel the signal on output terminal 12 is accurately indicative of the input signal on terminal 11. However, when there are a large number of channels connected together to output terminal 12, the signals on the input terminals 11 of the unselected channels are applied to output terminal 12 by leakage resistances 15 and 16 to undesirably influence the output signal from the selected channel.

Figure 2A:
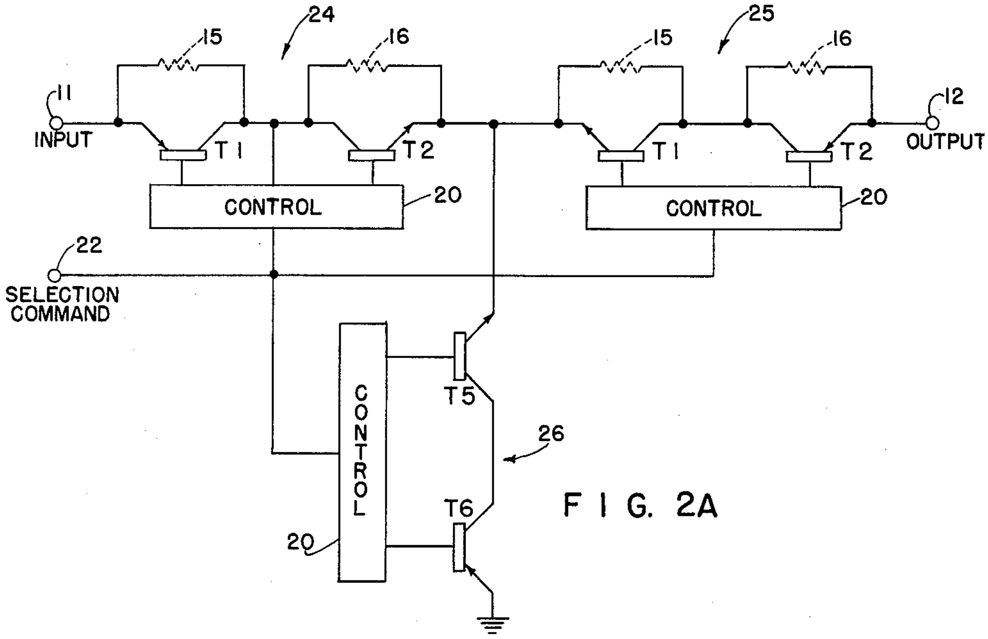
FIG. 2A is a combined block-schematic circuit diagram of a six-transistor per channel switching circuit for effectively providing isolation between input and output according to the invention.
Figure 2B:
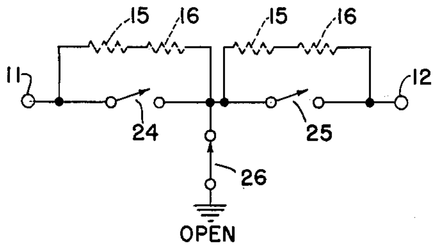
FIGS. 2B and 2C show a simplified switch representation of the circuit of FIG. 2.
Figure 2C:
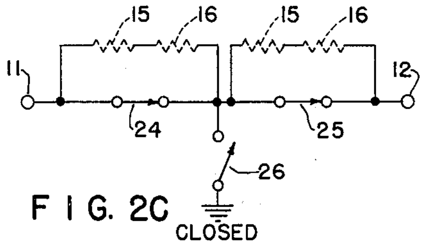

Referring to FIG. 2A, there is illustrated a combined block-schematic circuit diagram of a system according to the invention for isolating output terminal 12 from the input terminals 11 of unselected channels. Isolation is accomplished by connecting three of the circuits of FIG. 1 in a T-connection as illustrated to form a channel. In the Open condition with the channel unselected, complementary pairs 24 and 25 are normally non-conductive while transistor pair 26 is conductive to produce the effect represented by the switches in FIG. 2B. Note that any signal which leaks through the leakage resistances 15 and 16 of pair 24 is effectively shorted to ground by conductive pair 26. In the Closed condition, with the channel selected, pairs 24 and 25 are conductive while pair 26 is non-conductive as represented in FIG. 2C, thereby transmitting the signal on terminal 11 to terminal 12.

The circuit controlling the state of transistors T5 and T6 is identical to that disclosed in FIG. 1 except that the polarity of batteries 13 and 14 is reversed to maintain these transistors normally conductive and the relative sense between the primary winding and secondaries 23 and 24 is reversed so that the positive selection command pulse applied to terminal 22 is effective in rendering the transistor pair 26 non-conductive.

Figure 3:
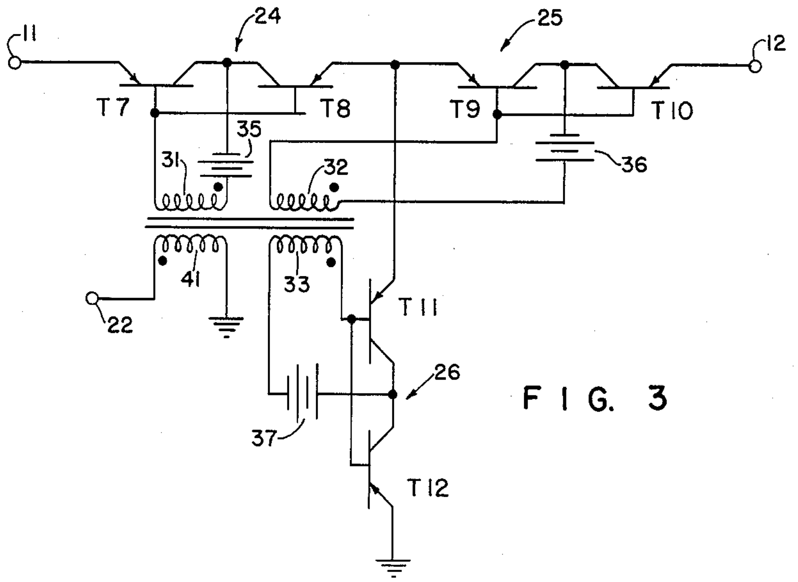
FIG. 3 is a schematic circuit diagram of a preferred embodiment of the invention for selectively coupling the signal on a respective input terminal to a common output terminal.

Referring to FIG. 3, there is illustrated a schematic circuit digram of a preferred embodiment of the invention for coupling the input signal on a respective terminal 11 to the common output terminal 12 of all channels in response to the application of a select command pulse to terminal 22 of the channel. This circuit employs all PNP transistors which may be of the same type. Additionally, a four winding transformer provides all the required control signals and only one biasing battery is required for each pair of transistors.

Transistors T7, T8, T9 and T10 form a series path between input terminal 11 and output terminal 12. Transistors T11 and T12 form a series path between the junction of transistors T8 and T9 and ground. The transistor pairs 24, 25 and 26 are formed by transistors T7–T12 as indicated. The bases of each pair are connected together to one end of a respective secondary winding 31, 32 and 33 of transformer 34. The other end of these windings is connected to a terminal of batteries 35, 36 and 37, respectively. The other terminal of each battery is connected to the collectors of a respective transistor pair. The polarity of the batteries is such that pairs 24 and 25 are normally non-conductive while pair 26 is biased to normally conduct. The primary winding 41 of transformer 34 is connected between command terminal 22 and ground. Application of a positive pulse to terminal 22 induces pulses across each secondary winding having a sense and amplitude which overcomes the battery bias and reverses the state of the transistor pairs so that pairs 24 and 25 conduct while pair 26 does not, thereby providing a low impedance path between input terminal 11 and output terminal 12.

Figure 4:
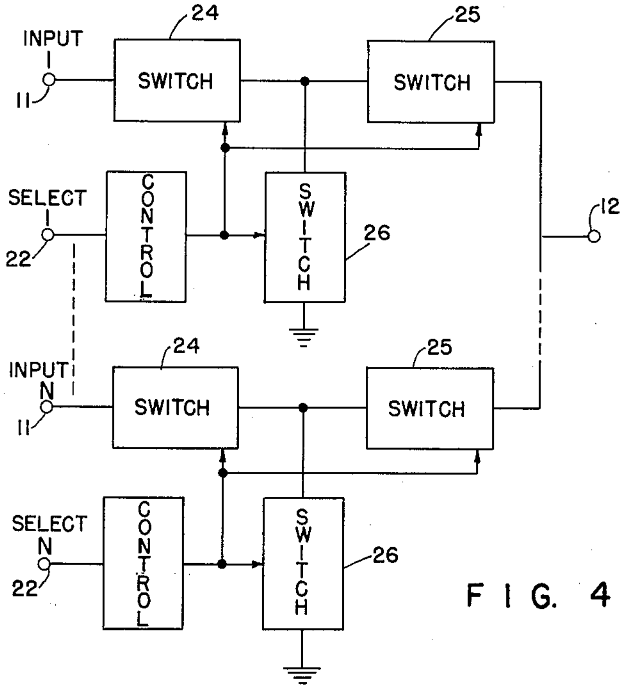
FIG. 4 is a block diagram of a multiplexing system according to the invention.

Referring to FIG. 4, there is shown a block diagram generally illustrating the logical arrangement of a multiplexing system incorporating the invention. Each channel is seen to comprise switches 24, 25 and 26 in a T-connection between a respective input terminal 11, a common ground and a common output terminal. Each channel is selected by the application of a select command pulse applied to a terminal 22 to activate an associated control unit 42 for controlling the state of the switches 24, 25 and 26 in the manner discussed above. The channels may be sampled in arbitrary or regular sequence in accordance with well-known programming techniques.

The invention is characterized by a number of features. The presence of separate open switches between the junction clamped to ground potential and input and output terminals of an unselected channel prevents the input of an unselected channel and the output from being loaded by the switch 26. At the same time, the clamping effect provided by switch 26 insures that isolation between the output terminal and the input terminal of unselected channels is virtually complete.

The specific circuits and control techniques disclosed herein are by way of example only. The principles of the invention are applicable to semiconducting switching devices employing diode bridges, all NPN transistor switches, and numerous other specific embodiments. Bipolar control signals may be employed in accordance with well known techniques to change the conductive state of the different transistors.

There has thus been described a multiplexing system which incorporates the advantages of semi-conductor devices with respect to low power consumption, low forward conducting resistance, compactness and ruggedness while providing a degree of isolation between unselected channels and the output comparable to that obtained with electron tubes. A multiplexing system incorporating the disclosed technique accurately samples the analog voltages of 20 channels at a 2.2 kc. sampling rate.

Those skilled in the art may now make numerous modifications of and departures from the specific embodiments described herein without departing from the inventive concepts. Consequently, the invention is to be construed as limited only by the spirit and scope of the appended claims.

What is claimed is:

1. A multiplexing system comprising, a plurality of input terminals, an output terminal, a common terminal, respective groups of first, second and third pairs of series-connected transistors associated with each of said input terminals, said first and second pairs being connected in series between a respective one of said input terminals and said output terminal, said third pair being connected between said common terminal and the junction of the associated series-connected first and second pairs, bias voltage means for maintaining said first and second pairs normally nonconductive and said third pair normally conductive, and means responsive to a selection signal for simultaneously rendering said first and second pairs conductive and the associated third pair nonconductive to transfer the signal then on the associated input terminal to said output terminal.

2. Apparatus for selectively isolating an input terminal from an output terminal comprising first and second switches serially connected between said input and output terminals, each of said first and second switches including a pair of transistors and means reversely biasing one junction of each transistor, a clamping switch connected to the junction of said first and second switches and a reference potential source, means normally holding said clamping switch closed, and means responsive to a selection signal for simultaneously causing said clamping switch to open and said reversely biased junctions to be forwardly biased whereby said input and output terminals are connected through a low impedance path.

3. Apparatus for selectively isolating an input terminal from an output terminal comprising first and second switches serially connected between said input and output terminals, each of said first and second switches including a pair of transistors and means reversely biasing one junction of each transistor, a third switch connected to a reference potential source and to the common junction of said first and second switches, said third switch including a pair of transistors and means normally forwardly biasing said transistors whereby said common junction is clamped to said reference potential source, and means responsive to a selection signal for simultaneously causing said reversely biased junctions to be forwardly biased and said third switch to unclamp said common junction from said reference potential source.

References Cited in the file of this patent

UNITED STATES PATENTS

| | | |
|---|---|---|
| 2,627,039 | MacWilliam | Jan. 27, 1953 |
| 2,657,318 | Rack | Oct. 27, 1953 |
| 2,836,734 | Cichanowiz | May 27, 1958 |
| 2,864,961 | Lohman et al. | Dec. 16, 1958 |
| 2,891,171 | Shockley | June 16, 1959 |
| 2,936,338 | James et al. | May 10, 1960 |
| 2,962,551 | Johannesen | Nov. 29, 1960 |
| 2,962,552 | Crowley | Nov. 29, 1960 |

OTHER REFERENCES

Shea: Principles of Transistor Circuits, Wiley & Sons, 1955.

Bright Publication, "Junction Transistor Used as Switches," in A.I.E.E. Transactions, Part I, Communication and Electronic, March 1955, vol. 74, #1, pages 111 to 121.

Wray Publication, "Transistorized Multiples," Electronics, Sept. 1, 1957, vol 30, #9.